(12) United States Patent
Kakimoto et al.

(10) Patent No.: US 7,889,067 B2
(45) Date of Patent: Feb. 15, 2011

(54) ALARM INFORMATION PROCESSING DEVICE AND ALARM INFORMATION PROCESSING METHOD

(75) Inventors: Mamoru Kakimoto, Musashino (JP);
Takashi Sato, Musashino (JP);
Takayuki Taketomi, Musashino (JP);
Yasunori Kobayashi, Musashino (JP)

(73) Assignee: Yokogawa Electric Corporation, Musashino-shi, Tokyo (JP)

( * ) Notice: Subject to any disclaimer, the term of this patent is extended or adjusted under 35 U.S.C. 154(b) by 531 days.

(21) Appl. No.: 12/016,396

(22) Filed: Jan. 18, 2008

(65) Prior Publication Data
US 2008/0174419 A1    Jul. 24, 2008

(30) Foreign Application Priority Data
Jan. 22, 2007    (JP)    ............................. 2007-011468

(51) Int. Cl.
*G08B 29/00*    (2006.01)
(52) U.S. Cl. ...................................... 340/514
(58) Field of Classification Search ................. 340/515, 340/506, 521, 525, 514; 700/9, 81
See application file for complete search history.

(56) References Cited

U.S. PATENT DOCUMENTS 5,768,119 A * 6/1998 Havekost et al. ............... 700/4
7,250,856 B2 * 7/2007 Havekost et al. ............ 340/517
2006/0179463 A1 * 8/2006 Chisholm et al. ............. 725/90

FOREIGN PATENT DOCUMENTS

JP    2003-186536 A    7/2003

* cited by examiner

*Primary Examiner*—Phung Nguyen
(74) *Attorney, Agent, or Firm*—Westerman, Hattori, Daniels & Adrian, LLP

(57) ABSTRACT

The invention provides an alarm information processing device and an alarm information processing method capable of verifying an information processing operation on the basis of alarm data with ease. An information processing means fetches the alarm data of a plant, and executes a predetermined information processing. A storage means stores the alarm data of the plant. A data generation means generates a testing alarm data for testing the operation of the information processing means in accordance with a user's operation. An operation reproduction means executes the same operation as the information processing means on the basis of the testing alarm data generated by the data generation means. An algorithm setting means defines an operation algorithm of the information processing means 51 in accordance with the user's operation.

5 Claims, 1 Drawing Sheet

ALARM INFORMATION PROCESSING DEVICE AND ALARM INFORMATION PROCESSING METHOD

FIELD OF THE INVENTION

The invention relates to an alarm information processing device and an alarm information processing method for fetching alarm data of a plant and executing a predetermined information processing relative to the alarm information as fetched.

BACKGROUND OF THE INVENTION

As field equipment have been recently intelligible, respective field equipment per se have generated alarms. Further, as production facilities of a plant are complex, there is a tendency that a safety system becomes complex and multiplex. Safety of the plant has been conventionally ensured by separately displaying and managing the individual alarms generated from devices and systems.

JP 2003-186536 A discloses an alarm monitoring device wherein an editable extension alarm filter is prepared and simulated data is applied to the prepared extended alarm filter before it becomes effective, thereby checking operation thereof.

However, since various alarm elements have been mixed in a plant, a problem has been encountered in that it becomes difficult to decide a priority order of the level of importance of alarm and so forth. In particular, in a development maker, or a plant having equipment and systems of different formats which are mixed therein, various alarms can not be handled unifiedly, so that it becomes impossible to execute processing integratively such as making an intelligent decision relative to the alarm data. Accordingly, there has been required a development of a system in which diversified alarms are unified and presented, or in which various information processing are integrated and executed relative to the alarm data.

However, according to the foregoing system, as a plant becomes complex, an engineering system for integrating various information processing to present the alarm data appropriately also becomes complex, so that it becomes necessary to check whether or not the engineering system is executed as intended.

SUMMARY OF THE INVENTION

It is an object of the invention to provide an alarm information processing device and an alarm information processing method capable of verifying operation of various information processing on the basis of alarm data with ease.

In the alarm information processing device of the invention provided with an information processing means for fetching alarm data of a plant and executing a predetermined information processing relative to the alarm data as fetched, said device comprises a test data generation means for generating a testing alarm data for testing operation of the information processing means.

According to the alarm information processing device, since the testing alarm data for testing the operation of the information processing means is generated, the operation of the information processing means can be verified with ease.

The information processing means can execute information processing on the basis of the testing alarm data that is generated by the test data generation means instead of the alarm data of the plant.

The alarm information processing device may be provided with an operation reproduction means that executes the same operation as the information processing means, and the operation reproduction means executes information processing on the basis of the testing alarm data generated by the test data generation means.

The alarm information processing device may be provided with a storage means for storing the alarm data of the plant and the test data generation means may generate the testing alarm data using the alarm data stored in the storage means.

The alarm information processing device may be provided with an algorithm setting means for determining an operation algorithm of the information processing means in accordance with a user's operation.

In an alarm information processing method of the invention provided with a step for fetching alarm data of a plant and executing a predetermined information processing relative to the alarm data as fetched, said method comprises a step of storing the alarm data of the plant, and a step of generating a testing alarm data for testing an operation of the step of executing the predetermined information processing in accordance with a user's operation using the alarm data that is stored in the step of storing the alarm data.

According to the alarm information processing method, since the testing alarm data for testing the operation of the information processing means is generated using the stored alarm data, the operation of the step for executing the information processing can be verified with ease.

According to the alarm information processing device of the invention, since the testing alarm data for testing the operation of the information processing means is generated, the operation of the information processing means can be verified with ease.

According to the alarm information processing method, since the testing alarm data for testing the operation of the information processing means is generated using the stored alarm data, the operation of the step for executing the information processing can be verified with ease.

BEST MODE FOR CARRYING OUT THE INVENTION

Figure 1:
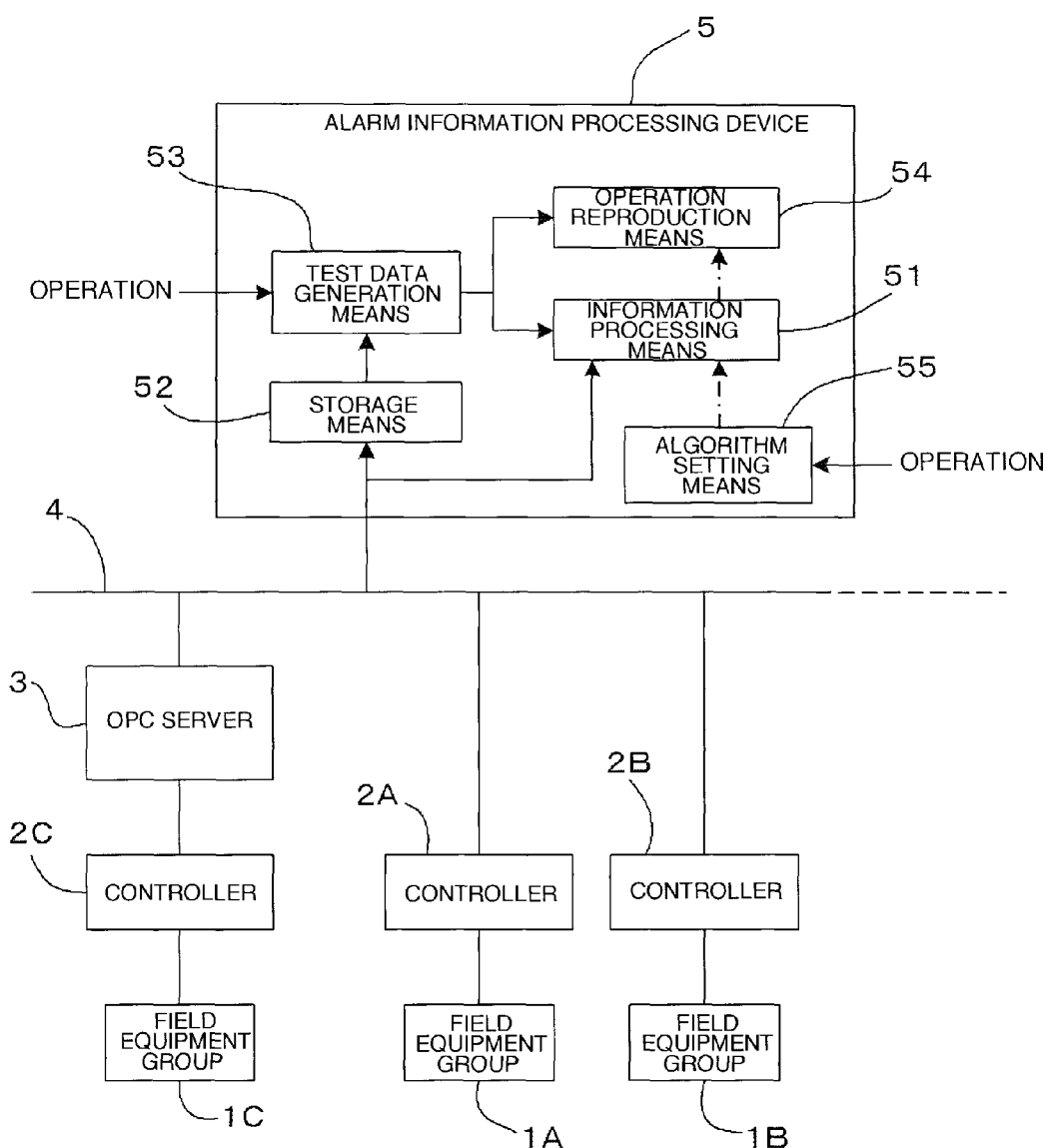
FIG. 1 is a block diagram showing a configuration of a plant to which the alarm information processing device is applied according to an embodiment of the invention.

An embodiment of an alarm information processing device of the invention is now described with reference to FIG. 1.

FIG. 1 is a block diagram showing a configuration of a plant to which the alarm information processing device is applied according to the embodiment of the invention.

As shown in FIG. 1, field equipment groups 1A and 1B are arranged in a plant, wherein the field equipment group 1A is connected to a communication line 4 via a controller 2A while the field equipment group 1B is connected to a communication line 4 via a controller 2B. A field equipment group 1C, which is different in development makers and formats from those of the field equipment groups 1A and 1B, is connected to the communication line 4 via a controller 2C and an OPC server 3. In such a way, according to the plant shown in FIG. 1, the field equipment having a plurality of specifications are used while mixed therewith. Further, the field equipment and controllers, each have a function to notify alarm data, but the formats of each alarm data are different depending on makers and formats.

An alarm information processing device 5 is connected to the communication line 4.

As shown in FIG. 1, the alarm information processing device 5 comprises an information processing means 51 for fetching alarm data of the plant and execute a predetermined information processing relative to the alarm data as fetched, a storage means 52 for storing the alarm data of the plant, a test data generation means 53 for generating testing alarm data for testing the operation of the information processing means 51 in accordance with a user's operation, an operation reproduction means 54 for executing the same operation as the information processing means 51 on the basis of the testing alarm data that is generated by the test data generation means 53, and an algorithm setting means 55 for determining an operation algorithm of the information processing means 51 in accordance with the user's operation.

Described next is an operation of the alarm information processing device 5.

The information processing means 51 of the alarm information processing device 5 receives alarm data that are notified from various sections of the plant via the communication line 4 and executes a normalization processing of the alarm data.

In the normalization step, the information processing means 51 decides the kind of the alarm data as received, for example, from which equipment alarm message is received, or the format of the alarm data. Further, the formats of the alarm data in which a plurality of formats are mixed are unified by executing a predetermined logic. For example, in the case where in a specific equipment used in the plant where the level of importance of an alarm is defined by a numerical value, while in different equipment where the level of importance of the alarm is indicated by a stepwise class of alarm, the level of importance of the alarm is unified into one scale. Further, for all the alarm data, the formats of data are unified into one format so that the contents of all the alarm data can be decided in unification, to be outputted as the alarm message.

For example, it is possible to unify the level of importance of an alarm into a standard adopted by a system of a specific maker, or the level of importance of all the alarms can be unified into a standard newly prepared by a user side.

Supposing that a system wherein the level of importance of an alarm is presented by a numerical value and a system wherein the level of importance of the alarm is indicated by a stepwise class of alarm are mixed, these systems can be unified into one system. For example, in the case where the systems are unified into the stepwise class, it is possible to set a logic so as to convert the level of importance of the alarm into "urgent alarm" if the level of importance is not less than 800, "critical alarm" if the importance is not less than 600, "middle alarm" if the level of importance is not less than 400, and "minor alarm" if the level of importance is less than 400.

Further, the information processing means 51 executes a logical decision such as suppression, grouping, filtering, shelving, and so forth of the alarm message, and the result of execution of the processing is reflected as a display of the alarm message and a file output of the alarm message.

A user can set an algorithm such as alarm design (normalization processing, suppression, grouping) and display design (filtering, shelving, shedding) in the information processing means 51 via the algorithm setting means 55. Accordingly, the user can arbitrarily set a rule for unifiedly handling a plurality of systems which are different in makers and formats and alarm data from the field equipment, and a method of handling the alarm data.

The user prepares a logic complying with the alarm design or display design by operating the algorithm setting means 55. The user can describe a logic with ease by use of, for example, general script language (Java (registered trademark) Script, VBScript, Perl and so forth).

Meanwhile, the storage means 52 of the information processing means 51 receives alarm data notified from various sections of the plant and stores them. The alarm data are the same as the alarm data to be given to the information processing means 51. As mentioned above, a plurality of formats are mixed in the alarm data, and the alarm data are stored one by one in the storage means 52 in a state of live data in which the formats are mixed. The alarm data can be stored as those in a CSV file format.

Further, according to the alarm information processing device 5 of the invention, a testing alarm data can be generated for testing the operation of the information processing means 51 in accordance with a user's operation by use of the test data generation means 53. The user can check whether the algorithm set via the algorithm setting means 55 can correctly embody the alarm design (normalization processing, suppression, grouping) and the display design (filtering, shelving, shedding) by verifying the operation of the information processing means 51 by use of the testing alarm data.

The operation reproduction means 54 of the alarm information processing device 5 executes the same operation as the information processing means 51 upon reception of the testing alarm data generated by the test data generation means 53. As a result, the operation reproduction means 54 can verify the operation of the information processing means 51. The operation reproduction means 54 may be configured by loading the algorithm set, for example, by the algorithm setting means 55, in accordance with a user's operation. The reproduction operation on the operation reproduction means 54 is presented to the user via a screen display, and the user can check whether or not an intended operation is realized by the screen display. By so doing, the user can verify in advance whether or not the logic newly prepared or altered by the algorithm setting means 55 operates normally.

Further, the operation of the information processing means 51 can be directly checked by giving the testing alarm data generated by the test data generation means 53 to the information processing means 51. In this case, the information processing means 51 executes information processing on the basis of the testing alarm data given by the test data generation means 53 instead of the alarm data notified by the various sections of the plant.

The test data generation means 53 reads the past alarm data from the storage means 52 in accordance with the user's operation, and gives the same alarm data to the operation reproduction means 54 or the information processing means 51. By so doing, the operation of the information processing means 51 can be tested by use of the last alarm data. Further, the test data generation means 53 has a function to process the alarm data, and also generates a new alarm data by editing the past alarm data that is read from the storage means 52 in accordance with the user's operation. Still further, the test data generation means 53 can also generate a new alarm data in accordance with the user's operation irrespective of the alarm data of the storage means 52. In such a way, according to the present embodiment, the operation of the information processing means 51 can be tested by the arbitrary alarm data generated on the basis of the user's operation.

The method of reading the alarm data from the storage means 52 can be arbitrarily designated. For example, it is possible to read an alarm data for a given period at a stretch so as to reproduce conditions during a certain period. Further, the alarm data can be read, for example, on the line basis.

Still further, the selected alarm data group can be read in advance and it can be given periodically to the operation reproduction means 54 or the information processing means 51. In this case, it is possible to verify the operation of the information processing means 51 under the circumstances where specific alarms are periodically and repetitively generated. For example, it is possible to check whether or not the processing such as suppression or filtering for notifying only the necessary alarm data is executed as designed.

The testing alarm data read from the storage means 52 or the testing alarm data generated by the test data generation means 53 can be utilized at any time by registering them in the database.

As mentioned above, according to the embodiment of the invention, since the testing alarm data can be prepared with ease by the test data generation means 53, the user can verify with ease whether the set algorithm is correct or not, thereby reducing the burden applied on an engineering system. Particularly, it is possible to verify alarm data which is difficult to generate alarm by actual equipment, thereby preventing erroneous operation caused by inadequacy of the engineering system. Still further, according to the present embodiment, since the verification of the operation is executed by the operation reproduction means 54, it is not necessary to stop the operation of the information processing means 51, thereby executing the verification while avoiding the effect on the plant.

As mentioned in the foregoing, according to the alarm information processing device of the invention, since the testing alarm data for testing the operation of the information processing means is prepared, the operation of the information processing means can be verified with ease.

A scope of application of the invention is not limited to the forgoing embodiment. The invention can be widely applied to the alarm information processing device and alarm information processing method capable of fetching alarm data of a plant and executing a predetermined information processing.

The invention claimed is:

1. An alarm information processing device provided with an information processing means for fetching alarm data of a plant and executing a predetermined information processing relative to the alarm data as fetched, said device comprising:
    a test data generation means for generating a testing alarm data for testing operation of the information processing means; and
    an operation reproduction means that executes the same operation as the information processing means, and the operation reproduction means information processing on the basis of the testing alarm data generated by the test data generation means.

2. The alarm information processing device according to claim 1, wherein:
    the information processing means can execute information processing on the basis of the testing alarm data that is generated by the test data generation means instead of alarm data of the plant.

3. The alarm information processing device according to claim 1, further comprising:
    a storage means for storing the alarm data of the plant and the test data generation means to generate the testing alarm data using the alarm data stored in the storage means.

4. The alarm information processing device according to claim 1, further comprising:
    an algorithm setting means for determining an operation algorithm of the information processing means in accordance with a user's operation.

5. An alarm information processing method provided with a step for fetching alarm data of a plant and executing a predetermined information processing relative to the alarm data as fetched, said method comprising:
    a step of storing the alarm data of the plant;
    a step of generating a testing alarm data for testing an operation of the step of executing the predetermined information processing in accordance with a user's operation using the alarm data that is stored in the step of storing the alarm data; and
    a step of executing the same operation as in the step for fetching alarm data of the plant and executing the predetermined information processing relative to the alarm data as fetched, and processing on the basis of the testing alarm data generated by the step of generating the testing alarm data.

\* \* \* \* \*